United States Patent
Verma (10) Patent No.: US 9,826,032 B2
(45) Date of Patent: *Nov. 21, 2017

(54) AUTOMATED SERVER CLUSTER SELECTION FOR VIRTUAL MACHINE DEPLOYMENT

(71) Applicant: Verizon Patent and Licensing Inc., Arlington, VA (US)

(72) Inventor: Navneet Verma, Ashburn, VA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/358,678

(22) Filed: Nov. 22, 2016

(65) Prior Publication Data
US 2017/0078379 A1   Mar. 16, 2017

Related U.S. Application Data

(63) Continuation of application No. 14/305,214, filed on Jun. 16, 2014, now Pat. No. 9,544,367.

(51) Int. Cl.
*H04L 12/911* (2013.01)
*H04L 29/08* (2006.01)
*G06F 9/455* (2006.01)

(52) U.S. Cl.
CPC ...... *H04L 67/1025* (2013.01); *G06F 9/45558* (2013.01); *H04L 47/70* (2013.01); *H04L 67/1008* (2013.01)

(58) Field of Classification Search
CPC . H04L 67/1025; H04L 47/70; H04L 67/1008; G06F 9/45558

USPC ......................................................... 709/226
See application file for complete search history.

(56) References Cited

U.S. PATENT DOCUMENTS

| | | | | |
|---|---|---|---|---|
| 6,859,834 | B1 * | 2/2005 | Arora | G06F 9/5033 709/225 |
| 9,465,630 | B1 * | 10/2016 | Muniz | G06F 9/455 |
| 2007/0271560 | A1 * | 11/2007 | Wahlert | G06F 8/61 718/1 |
| 2013/0111468 | A1 * | 5/2013 | Davis | G06F 9/5077 718/1 |
| 2013/0145364 | A1 * | 6/2013 | Yang | G06F 9/45558 718/1 |
| 2013/0173768 | A1 * | 7/2013 | Kundu | G06F 9/5077 709/223 |

(Continued)

*Primary Examiner* — Wing F Chan
*Assistant Examiner* — Billy H Ng (57) ABSTRACT

A device receives a virtual machine (VM) to be deployed, and identifies multiple network device clusters for possible VM deployment. The device applies a weighting parameter to at least one of the multiple network device clusters to favor selection of the at least one of the multiple network device clusters over other network device clusters. The device receives user selection of one or more network device clusters from the multiple network device clusters to generate a disabled group of network device clusters and an enabled group of network device clusters, wherein the disabled group of network device clusters excludes at least one of the multiple network device clusters. The device selects a network device cluster, from the enabled group of network device clusters, for deployment of the VM based on the weighting parameter applied to the at least one of the multiple network device clusters.

16 Claims, 10 Drawing Sheets

(56) References Cited

U.S. PATENT DOCUMENTS

| | | | |
|---|---|---|---|
| 2013/0290543 A1* | 10/2013 | Lochhead | H04L 41/0806 709/226 |
| 2014/0059207 A1* | 2/2014 | Gulati | G06F 9/505 709/224 |
| 2016/0098297 A1* | 4/2016 | Yuyitung | G06F 11/3442 718/104 |

* cited by examiner

FIG. 10

# AUTOMATED SERVER CLUSTER SELECTION FOR VIRTUAL MACHINE DEPLOYMENT

RELATED APPLICATION

The present application claims priority from U.S. application Ser. No. 14/305,214, filed Jun. 16, 2014, the contents of which are hereby incorporated by reference herein in their entirety.

BACKGROUND

A virtual machine includes a software-based emulation of a physical computer where the virtual machine executes programs like a physical machine. A characteristic of a virtual machine is that its software is limited to the resources and abstractions provided by the virtual machine, meaning that a virtual machine cannot escape the boundaries of its virtual environment. Virtual machines are classified into two different classifications: 1) a system virtual machine; or 2) a process virtual machine. A system virtual machine provides a complete system platform that supports the execution of an entire operating system and emulates an existing architecture. With a system virtual machine, multiple operating system environments can co-exist on a same computer in isolation from each other. A system virtual machine can provide an instruction set architecture that is different from that of the real machine. A process virtual machine supports a single process and is typically portable and flexible. A process virtual machine runs as a normal application inside a host operating system and provides a platform-independent programming environment that allows a program to execute in a same manner on any platform.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

In a virtualized environment, there may be multiple clusters of servers (i.e., physical servers) servicing multiple different virtual machines (VMs). In embodiments described herein, a goal of automated deployment/self-provisioning is to automate the selection of a cluster when a new VM will best fit. The resources that need to be considered during such a process include the available capacity of the physical central processing unit(s) (CPU(s)), memory, disk storage, and network bandwidth. In a virtualized environment, the disk storage and network bandwidth are considered external to the physical servers running the VMs. Technologies such as a Storage Area Network (SAN), Network-Attached Storage (NAS), and network load balancing may be used to effectively address disk storage and network bandwidth resource limitations.

CPU and memory on physical servers (hereinafter referred to as "servers," "server clusters," or "network device clusters") are considered finite resources and are limited with respect to over-provisioning. During VM deployment, care must be taken so as not to exceed these finite resources. Exceeding the limits of these resources can impact the performance of all of the VMs currently residing on a cluster, leading to undesired consequences. In a large virtualization environment, as the environment grows, multiple clusters may be implemented to service the environment. Each cluster can have a varying quantity of physical resources (e.g., physical CPU and physical memory). In a self-serviced, automated provisioning and dynamic environment, where VMs are continuously provisioned, resized and decommissioned, care must be taken to efficiently utilize the resources. The automated process, described herein, for selecting a server cluster for VM deployment efficiently utilizes physical CPU and memory resources while taking into account current CPU allocation, currently available memory, high availability options within each of the server clusters, and administrator-supplied manual overrides.

Figure 1:
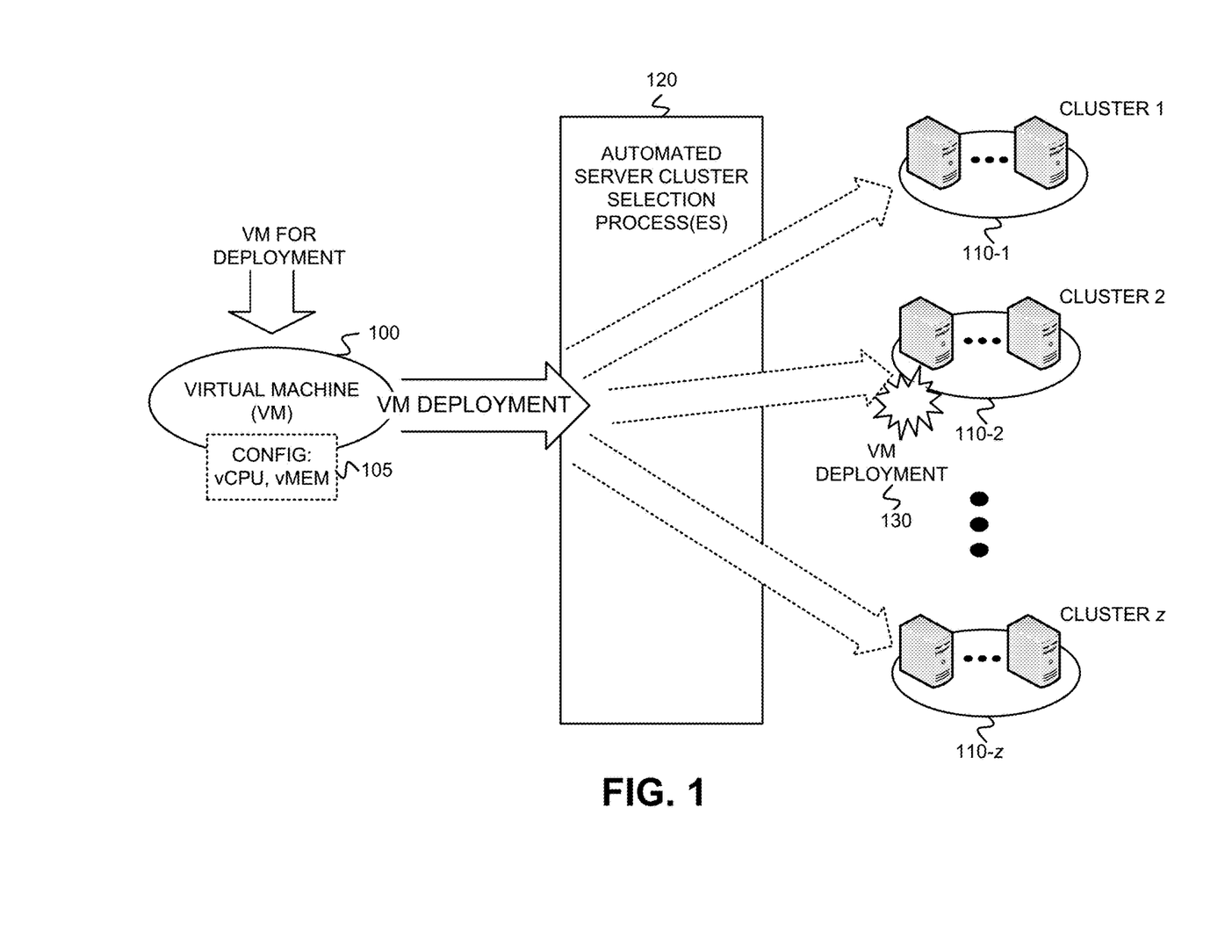
FIG. 1 is a diagram that depicts an overview of an automated server cluster selection process for deploying a virtual machine (VM)

FIG. 1 is a diagram that depicts an overview of an automated server cluster selection process for deploying a virtual machine (VM). As shown in FIG. 1, a VM 100 may be received for deployment within a server cluster. VM 100 may include a VM configuration 105 that further includes a virtual central processing unit (vCPU) parameter and an amount of virtual memory (vMEM) parameter. The vCPU parameter indicates a number of CPUs required by VM 100, where the number may include any rational number. The vMEM parameter indicates an amount of memory (in GB) required by VM 100. An automated server cluster selection process, implemented by a VM deployment manager (not shown in FIG. 1) may automatically select a specific server cluster, from multiple different identified server clusters 110-1 through 110-z (where z is an integer greater than or equal to two), into which to deploy VM 100. The automated server cluster selection process may include, for example, the process of FIG. 7 described in further detail below. Upon selection of a server cluster, process 120 may deploy 130 VM 100 in the selected server cluster (e.g., cluster 110-2 depicted as an example in FIG. 1).

Figure 2:
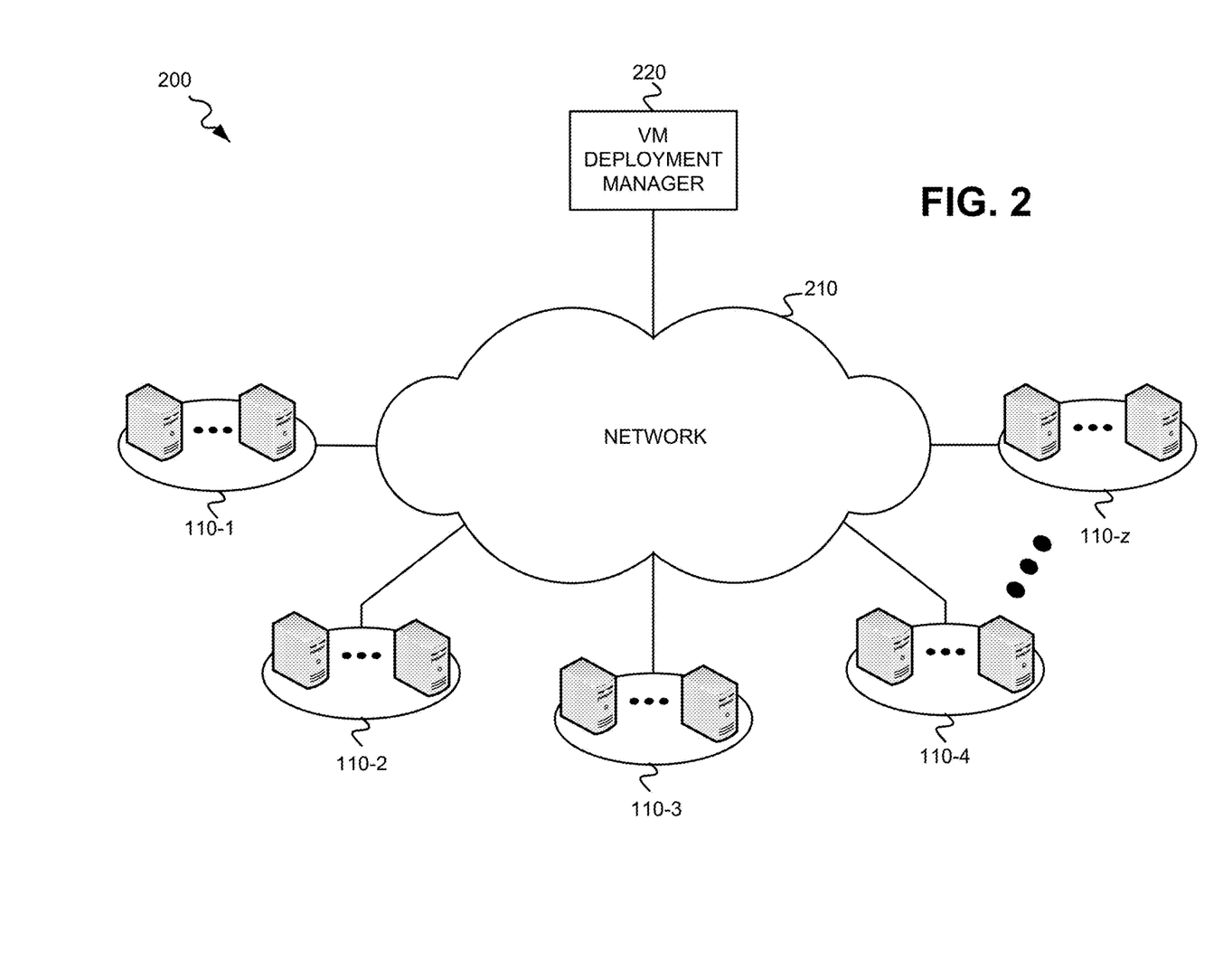
FIG. 2 is a diagram that depicts an exemplary network environment in which the automated server cluster selection process of FIG. 1 may be implemented.

FIG. 2 is a diagram that depicts an exemplary network environment 200 in which the automated server cluster selection process of FIG. 1 may be implemented. As shown, network environment 200 may include a network 210, a virtual machine (VM) deployment manager 220, and server clusters 110-1 through 110-z (individually and generically referred to herein as "server cluster 110" or "cluster 110"). VM deployment manager 220 and server clusters 110-1 through 110-z may each connect, either directly or indirectly, to network 210. In some embodiments, each server of server clusters 110-1 through 110-z may connect directly to network 210, or may connect indirectly to network 210 via another network (e.g., via a local area network (LAN) (not shown)).

Network 210 may include one or more networks of various types including, for example, a Public Switched Telephone Network (PSTN), a wireless network, a LAN, a wide area network (WAN), a metropolitan area network (MAN), an intranet, or the Internet. The wireless network may include a satellite network, a Public Land Mobile Network (PLMN), or a wireless LAN or WAN (e.g., Wi-Fi).

VM deployment manager 220 may include a network device that performs the automated server cluster selection process 120 for VM deployment, as described herein. VM deployment manager 220 may receive VMs for deployment, may automatically select a server cluster for each of the VMs, and may deploy and provision each of the VMs at the selected cluster.

Figure 3:
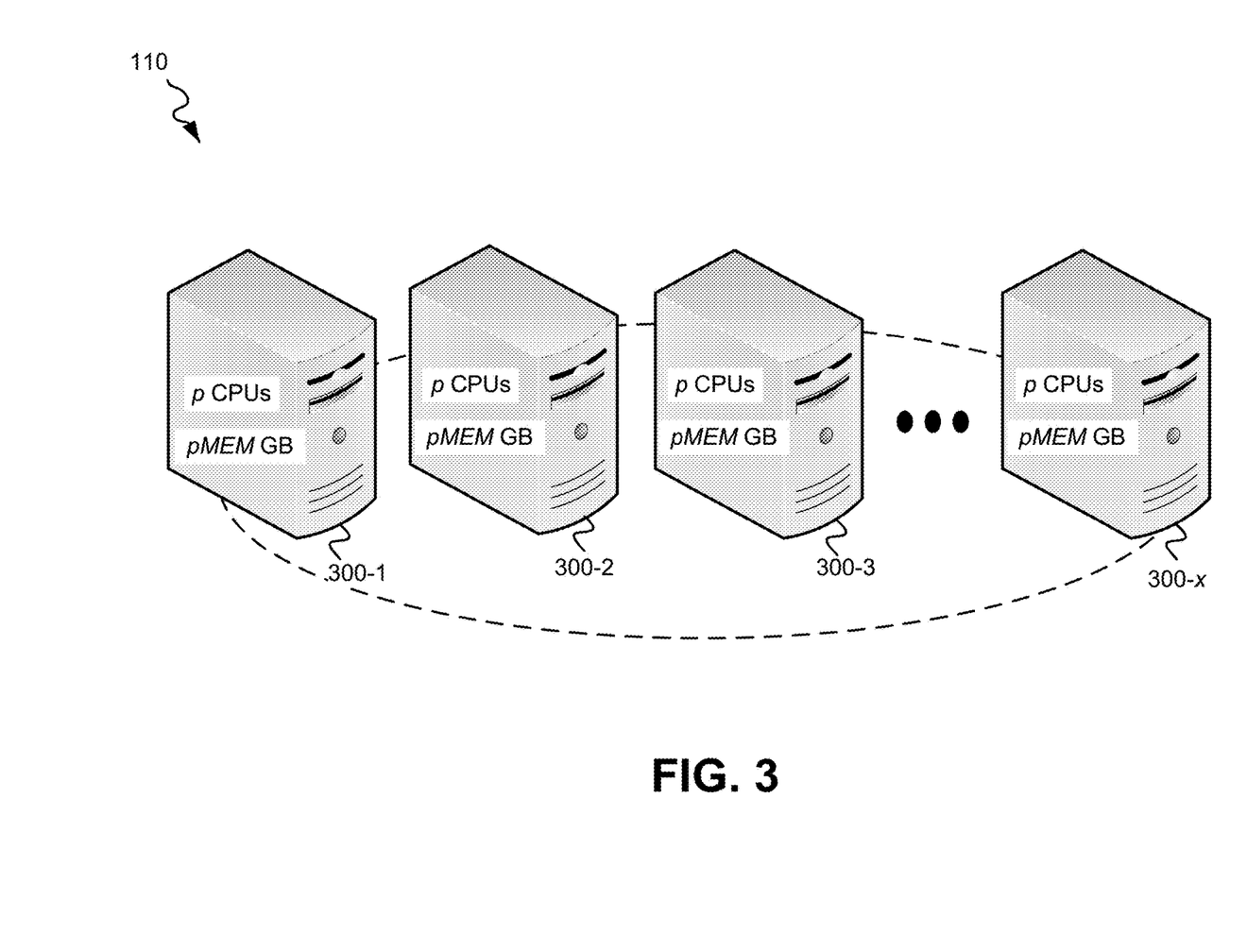
FIG. 3 is a diagram that depicts an exemplary one of the server clusters of FIG. 2.

Each of server clusters 110-1 through 110-z may include a cluster of multiple servers, such as, for example, multiple network devices, as described in further detail with respect to FIG. 3. Each one of the servers may include a network device, such as a network connected computer, into which one or more VMs may be deployed and provisioned for subsequent execution.

The configuration of components of network environment 200 illustrated in FIG. 2 is for illustrative purposes. Other configurations may be implemented. Therefore, network environment 200 may include additional, fewer and/or different components that may be configured in a different arrangement from that depicted in FIG. 2.

FIG. 3 is a diagram that depicts an exemplary server cluster 110. As shown in FIG. 3, server cluster 110 may include one or more servers 300-1 through 300-x (where x is an integer greater than or equal to 1; each server is generically and individually referred to herein as a "server 300" or a "network device 300"). In one embodiment, each server of servers 300-1 through 300-x may include a network device having an identical configuration, including a same number of physical CPUs (pCPU), and a same amount, in GB, of physical memory (pMEM).

Servers 300-1 through 300-x may interconnect with one another, and with network 210 via, for example, a LAN (not shown). Other types of networks may be used, however, for interconnecting servers 300-1 through 300-x with one another, and with network 210. In other embodiments, each of servers 300-1 through 300-x may connect directly to network 210, instead of via an intervening network.

Figure 4:
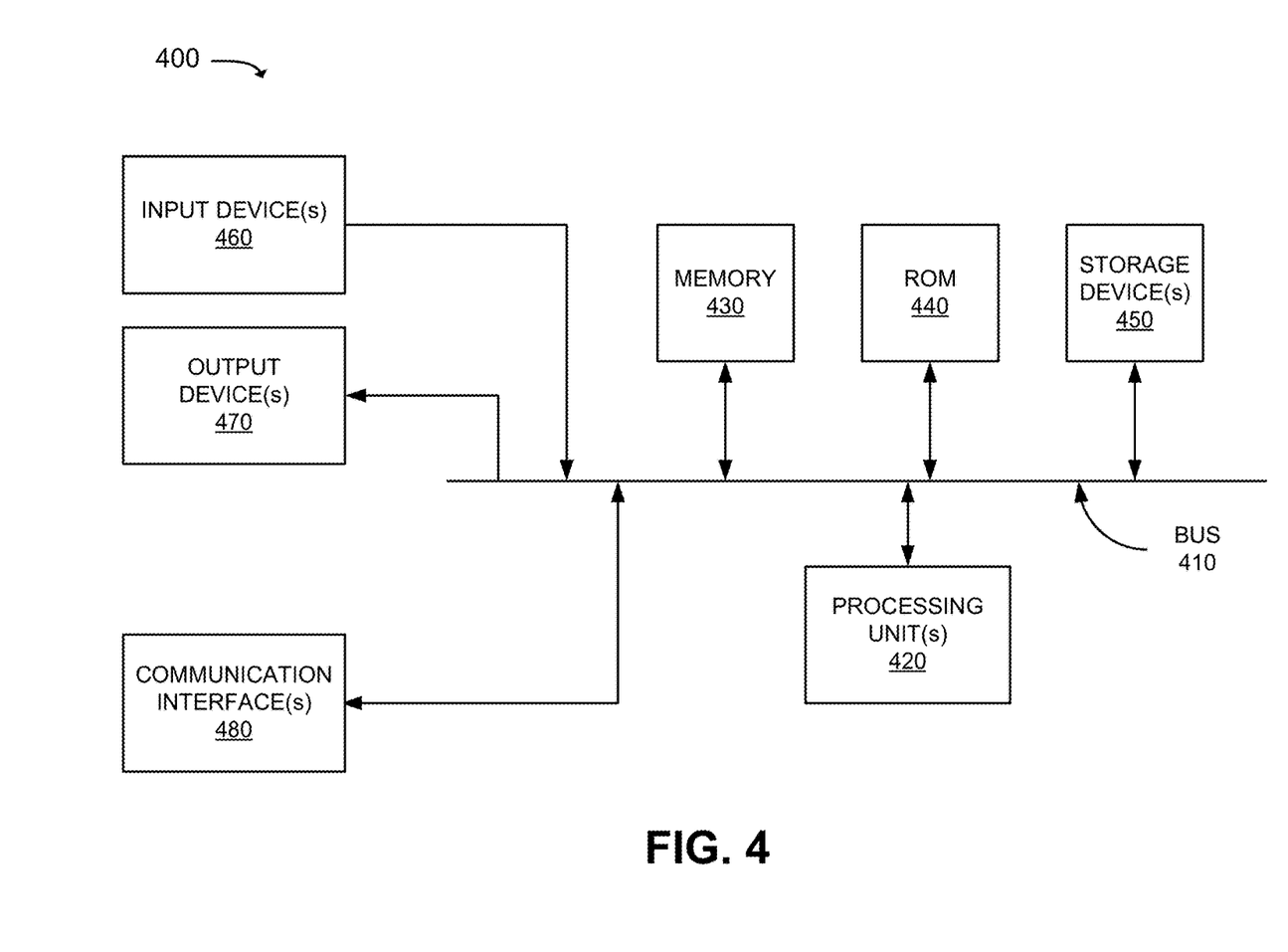
FIG. 4 is a diagram that depicts exemplary components of a device that may correspond to a server of the server clusters, or the virtual machine deployment manager, of FIG. 2.

FIG. 4 is a diagram that depicts exemplary components of a device 400. Server 300 and VM deployment manager 220 may each have the same or similar components, in a same or similar configuration, to that of device 400 shown in FIG. 4. Device 400 may include a bus 410, a processing unit(s) 420, a main memory 430, a read only memory (ROM) 440, a storage device 450, an input device(s) 460, an output device(s) 470, and a communication interface(s) 480. Bus 410 may include a path that permits communication among the elements of device 400.

Processing unit(s) 420 may include one or more processors or microprocessors, or processing logic, which may interpret and execute instructions. In an implementation in which device 400 corresponds to server 300, processing unit(s) 420 may include a number, i.e., pCPU, of central processing units (CPUs), where pCPU is an integer number of physical CPUs greater than or equal to one. Memory 330 may include a random access memory (RAM) or another type of dynamic storage device that may store information and instructions for execution by processing unit(s) 420. In an implementation in which device 400 corresponds to server 300, memory 430 may include pMEM Gigabytes (GB) of memory, where pMEM comprises an integer quantity, in GB, of physical memory. Read Only Memory (ROM) 440 may include a ROM device or another type of static storage device that may store static information and instructions for use by processing unit(s) 420. Storage device 450 may include a magnetic and/or optical recording medium. Main memory 430, ROM 440 and storage device 450 may each be referred to herein as a "tangible non-transitory computer-readable medium."

Input device 460 may include one or more mechanisms that permit an operator (or user) to input information to device 400, such as, for example, a keypad or a keyboard, a display with a touch sensitive panel, voice recognition and/or biometric mechanisms, etc. Output device 470 may include one or more mechanisms that output information to the operator, including a display, a speaker, etc. Communication interface(s) 480 may include a transceiver that enables device 400 to communicate with other devices and/or systems. For example, communication interface(s) 480 may include a wired or wireless transceiver for communicating with other servers 300, with network 210, or with another network, such as a LAN.

The configuration of components of device 400 illustrated in FIG. 4 is for illustrative purposes only. Other configurations may be implemented. Therefore, device 400 may include additional, fewer and/or different components, or differently arranged components, from those depicted in FIG. 4.

Figure 5:
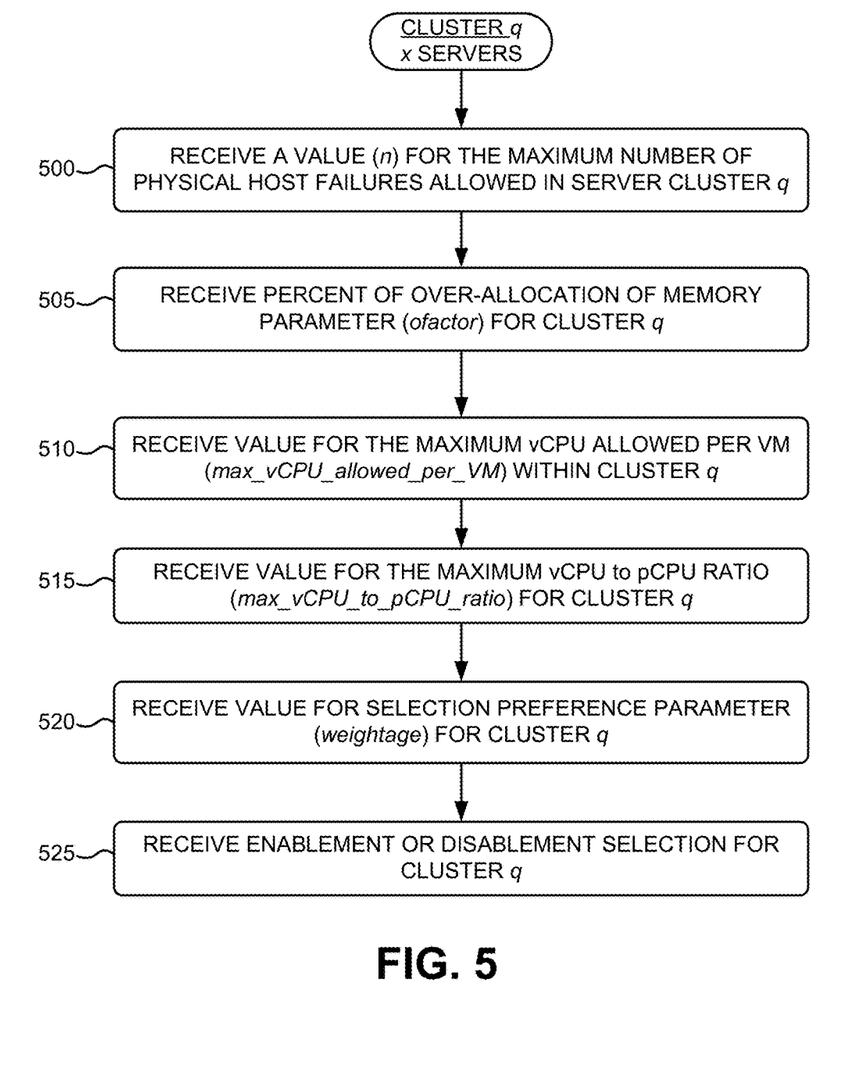
FIG. 5 is a flow diagram that illustrates an exemplary process for receiving parameters used in the automated server cluster selection process for deploying a virtual machine (VM) of FIG. 7.

FIG. 5 is a flow diagram that illustrates an exemplary process for receiving parameters used in the automated server cluster selection process 120 for deploying a virtual machine (VM). The exemplary process of FIG. 5 may be implemented by VM deployment manager 220 to receive parameters for a given cluster q having x servers.

The exemplary process may include receiving a value (n) for the maximum number of physical host failures (e.g., server failures) allowed in a server cluster q (block 500). The server cluster q may correspond to server cluster 110 depicted in FIG. 3, where cluster 110 includes x servers 300-1 through 300-x. A server cluster q may be configured to tolerate a certain number of physical host failures before the cluster fails to provide the required service level agreements. When that number of physical host failures is actually exceeded, catastrophic events, like service outages, can occur. For example, an administrator or operator of server cluster q or VM deployment manager 220 may, based on a knowledge of the capabilities of the servers of the server cluster and the required service level agreements, specify the value n for the maximum number of physical host failures allowed in the server cluster.

VM deployment manager 220 may receive a percent of over-allocation of memory parameter (ofactor) for cluster q (block 505). In a VM environment, physical memory (pMEM) may be over-allocated to virtual memory (vMEM) such that the virtual memory exceeds the physical memory. The decision to over allocate physical memory may be based on service level agreements and a nature of load within a given server cluster. Additionally, a certain amount of physical memory (e.g., 5 percent or 0.05) must be dedicated for the proper working of certain critical functions of a cluster such, as for example, the proper working of a hypervisor (i.e., a virtual machine monitor) of the server cluster. The global variable ofactor can be used to specify the percent of over-allocation memory within a server cluster. If an over allocation of physical memory of 10 percent in a server cluster is desired, then ofactor can be set to 1.10−0.05=1.05 (where 0.05 is subtracted for the proper working of critical functions like the hypervisor).

VM deployment manager 220 may receive a value for the maximum number of virtual CPUs (vCPU) allowed per virtual machine (max_vCPU allowed_per VM) within cluster q (block 510). The max_vCPU_allowed_per_VM value may be defined by an administrator to provide an optimal performance of VMs within the server cluster q, and should be based on the type of hardware of the corresponding physical host (i.e., server). VM deployment manager 220 may receive a value for the maximum virtual CPU to physical CPU ratio (max_vCPU_to_pCPU_ratio) for cluster q (block 515). The value for the max_vCPU_to_pCPU_ratio includes an administrator defined maximum value for a number of virtual CPUs divided by the actual number of physical CPUs. The max_vCPU_to_pCPU_ratio for cluster q may be defined based on the type of hardware, including the specifically deployed processor family of the servers of cluster q. Newer and faster processors may have a higher max_vCPU_to_pCPU_ratio value as compared to older processors.

VM deployment manager 220 may receive a value for a selection preference parameter (weightage) for cluster q (block 520). The selection preference parameter provides bias in the automated server cluster selection process. All other parameters being equal, the selection preference parameter weightage favors selection of a certain cluster and may be used by the administrator, for example, to give a higher preference to newer hardware. VM deployment manager 220 may receive an enablement or disablement selection for cluster q (block 525). The administrator of the server cluster or VM deployment manager 220 may manually disable or enable a cluster q to exclude, or include, the server cluster q in the automated server cluster selection process. For example, if a given server cluster is undergoing maintenance, or is otherwise unavailable, the administrator may disable that server cluster from inclusion in the server cluster selection process.

The exemplary process of FIG. 5 may be repeated, for example, upon manual initiation by an administrator of server clusters 110-1 through 110-z or VM deployment manager 220 to change one or more values of x, n, ofactor, max_vCPU_allowed_per_VM, max_vCPU_to_pCPU, weightage or to change the enablement/disablement selection for a cluster q. The blocks of the process of FIG. 5 may be repeated in sequence to change any of the received values, or only a single block of the process of FIG. 5 may be repeated to change a single received value (e.g., the administrator may only change the selection preference parameter weightage). The exemplary process of FIG. 5 may be repeated, or performed in parallel, for each cluster 110 of the server clusters.

Figure 6:
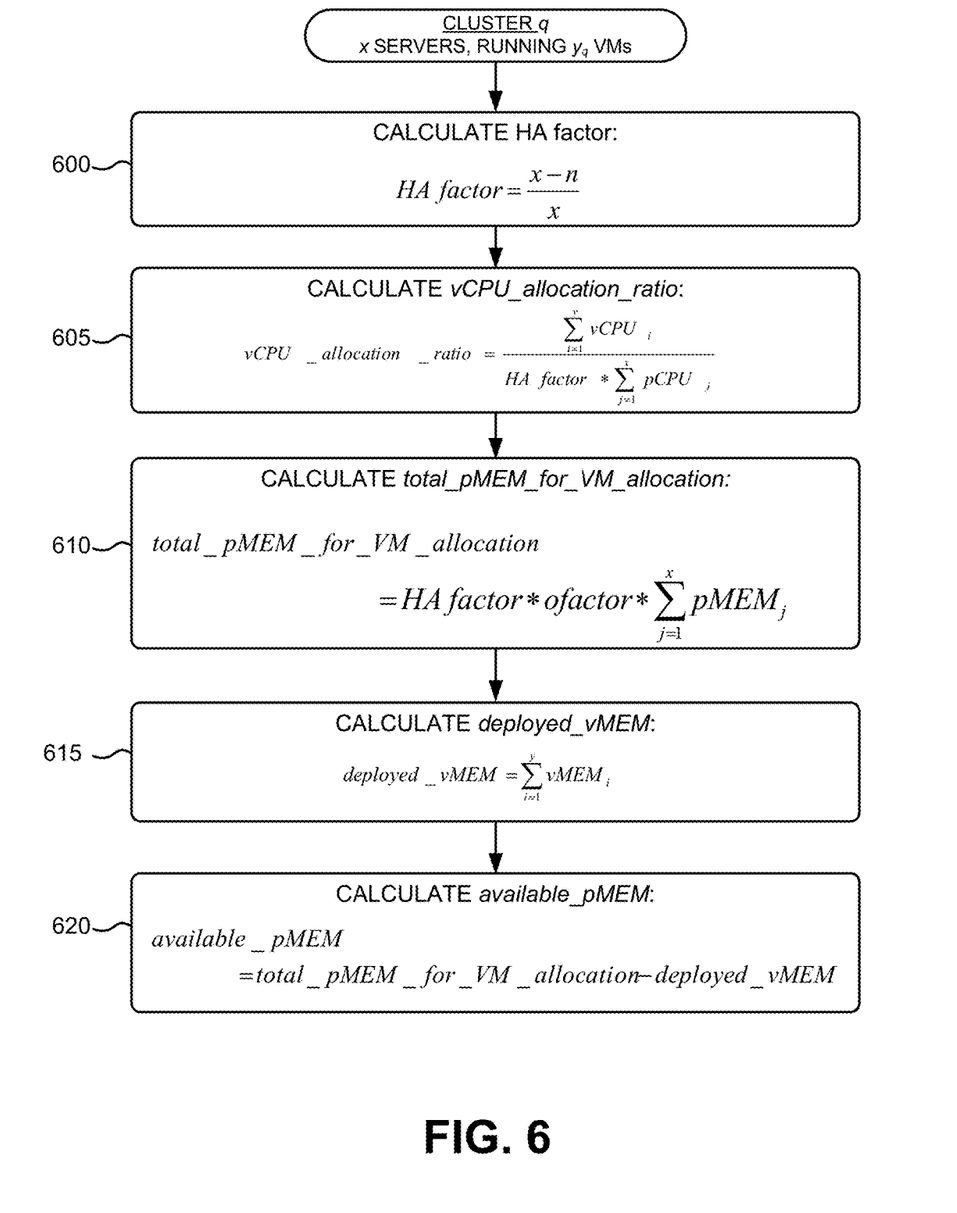
FIG. 6 is a flow diagram that illustrates an exemplary process for calculating additional parameters, based on other parameters received in the exemplary process of FIG. 5, for use in the automated server cluster selection process of FIG. 7.
Figure 7:
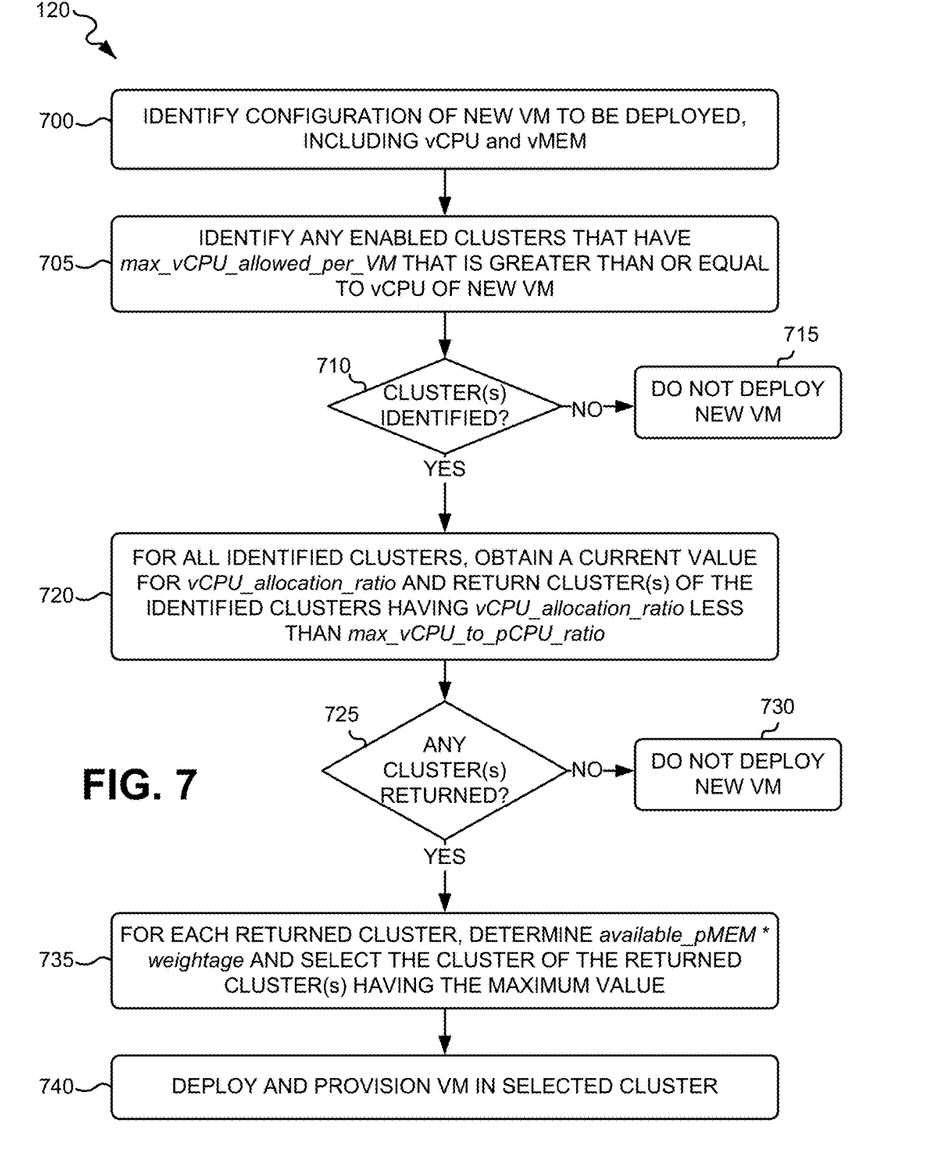
FIG. 7 is a flow diagram that illustrates an exemplary automated selection process for deploying a virtual machine in a selected server cluster of multiple server clusters.

FIG. 6 is a flow diagram that illustrates an exemplary process for calculating additional parameters, based on other parameters received in the exemplary process of FIG. 5, for use in the automated server cluster selection process 120 for VM deployment of FIG. 7. The exemplary process of FIG. 6 may be implemented by VM deployment manager 220. The exemplary process of FIG. 6 may be executed for each cluster q of server clusters 110-1 through 110-z, with each cluster having x servers (hosts) and running y VMs, where x and y may be different for each cluster. Execution of the exemplary process of FIG. 6 may utilize current values of x, n, ofactor, max_vCPU_allowed_per_VM, max_vCPU_to_pCPU, weightage and the enablement/disablement selection for cluster q received from the exemplary process of FIG. 5.

The exemplary process may include VM deployment manager 220 calculating a host failure value (HA factor) for cluster q having x servers (block 600) using:

$$\text{HA factor} = \frac{x-n}{x} \quad \text{Eqn. (1)}$$

where n is the maximum number of physical host failures in a cluster of x servers (received at block 500 of FIG. 5).

VM deployment manager 220 may calculate a value for the allocation of physical CPUs to virtual CPUs (vCPU_allocation ratio) within cluster q (block 605) using:

$$\text{vCPU\_allocation\_ratio} = \frac{\sum_{i=1}^{y} vCPU_i}{HA \text{ factor} * \sum_{j=1}^{x} pCPU_j} \quad \text{Eqn. (2)}$$

where a server cluster has x identical physical hosts (i.e., servers) ($HOST_1$, $HOST_2$, ..., $HOST_x$), with each $HOST_1$ configured with a number $pCPU_j$ of physical CPUs and $pMEM_j$ GB of physical memory, where the cluster q is currently running y VMs ($VM_1$, $VM_2$, ..., $VM_y$), and where $vCPU_i$ is the number of virtual CPUs currently being used by a virtual machine $VM_i$ running in a respective server cluster being denoted by $vCPU_i$ and the virtual memory being used by virtual machine $VM_i$ denoted by $vMEM_i$.

VM deployment manager 220 may calculate a value of total physical memory available for virtual machine allocation (total_pMEM_for_VM_allocation) (block 610) for cluster q using:

$$\text{total\_pMEM\_for\_VM\_allocation} = \quad \text{Eqn. (3)}$$
$$HA \text{ factor} * ofactor * \sum_{j=1}^{x} pMEM_j$$

with HA factor being the value calculated in block 600, and ofactor being the memory over-allocation parameter received in block 505 of FIG. 5.

VM deployment manager 220 may calculate a deployed virtual memory value (deployed vMEM) (block 615) for cluster q using:

$$\text{deployed\_vMEM} = \sum_{i=1}^{y} vMEM_i \quad \text{Eqn. (4)}$$

where the deployed vMEM value for cluster q includes a sum of the amount of virtual memory for all of the currently running VMs $VM_1$ through $VM_y$, for cluster q.

VM deployment manager 220 may calculate the available physical memory value (available_pMEM) (block 620) for cluster q using:

available_pMEM=total_pMEM_for_VM_allocation− deployed_vMEM       Eqn. (5)

where the value total pMEM for VM allocation is calculated in block 610 and the value deployed_vMEM is calculated in block 615.

The exemplary process of FIG. 6 may, for example, be repeated periodically for each cluster q of server clusters 110-1 through 110-z, or may be repeated when any of values of x, n, ofactor, max_vCPU_allowed_per_VM, max_vCPU_to_pCPU, weightage or enablement/disablement selection for a cluster q change.

FIG. 7 is a flow diagram that illustrates an exemplary automated server cluster selection process 120 for deploying a virtual machine in a selected server cluster of multiple server clusters. The exemplary process of FIG. 7 may be implemented by VM deployment manager 220. The description of FIG. 7 below refers to the examples depicted in FIGS. 8-10.

The exemplary process may include VM deployment manager 220 identifying a configuration of the new VM to be deployed, including the new VM's vCPU and vMEM (block 700). Each new VM to be deployed has inherent configuration parameters, including a number of virtual CPUs vCPU required by the VM, and an amount of virtual memory vMEM (in GB) required by the VM. The configuration parameters for the new VM may be used in the server cluster selection process 120, as described further herein.

Figure 8:
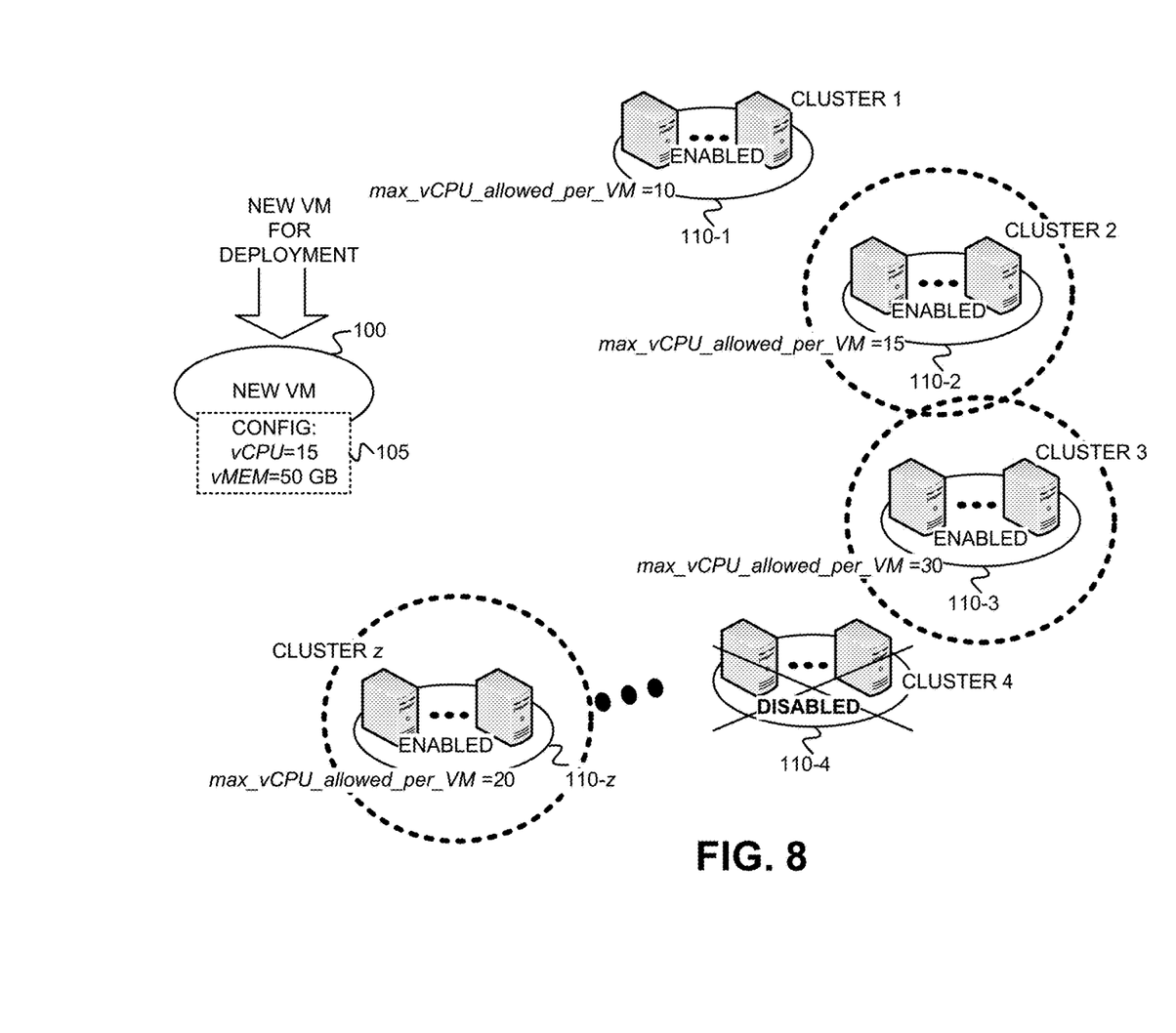
FIGS. 8-10 are diagrams that graphically depict examples associated with the process of FIG. 7.

VM deployment manager 220 may identify any enabled server clusters that have a value for max_vCPU_allowed_per_VM that is greater than or equal to the vCPU of the new VM (block 705). As shown in the example of FIG. 8, server clusters 110-1 through 110-z may all have been enabled, except for server cluster 4 110-4 that has been disabled for maintenance by the administrator. Additionally, as shown in FIG. 8, new VM 100 received for deployment has a configuration that includes a vCPU of 15, and a vMEM of 50 GB. Server cluster 110-1 has a value for max_vCPU_allowed_per_VM of 10, server cluster 110-2 has a value for max_vCPU_allowed_per_VM of 15, server cluster 110-3 has a value for max_vCPU_allowed_per_VM of 30, and server cluster 110-z has a value for max_vCPU_allowed_per_VM of 20. As shown by the dashed circular lines, server clusters 110-2, 110-3 and 110-z are each identified as having a value for max_vCPU allowed_per_VM greater than or equal to the vCPU of 15 of new VM 100. VM deployment manager 220 may determine if any cluster(s) has/have been identified in block 705 (block 710). If no cluster(s) has/have been identified (NO—block 710), then VM deployment manager 220 may not deploy the new VM in a server cluster (block 715) and the exemplary process for the new VM may end.

Figure 9:
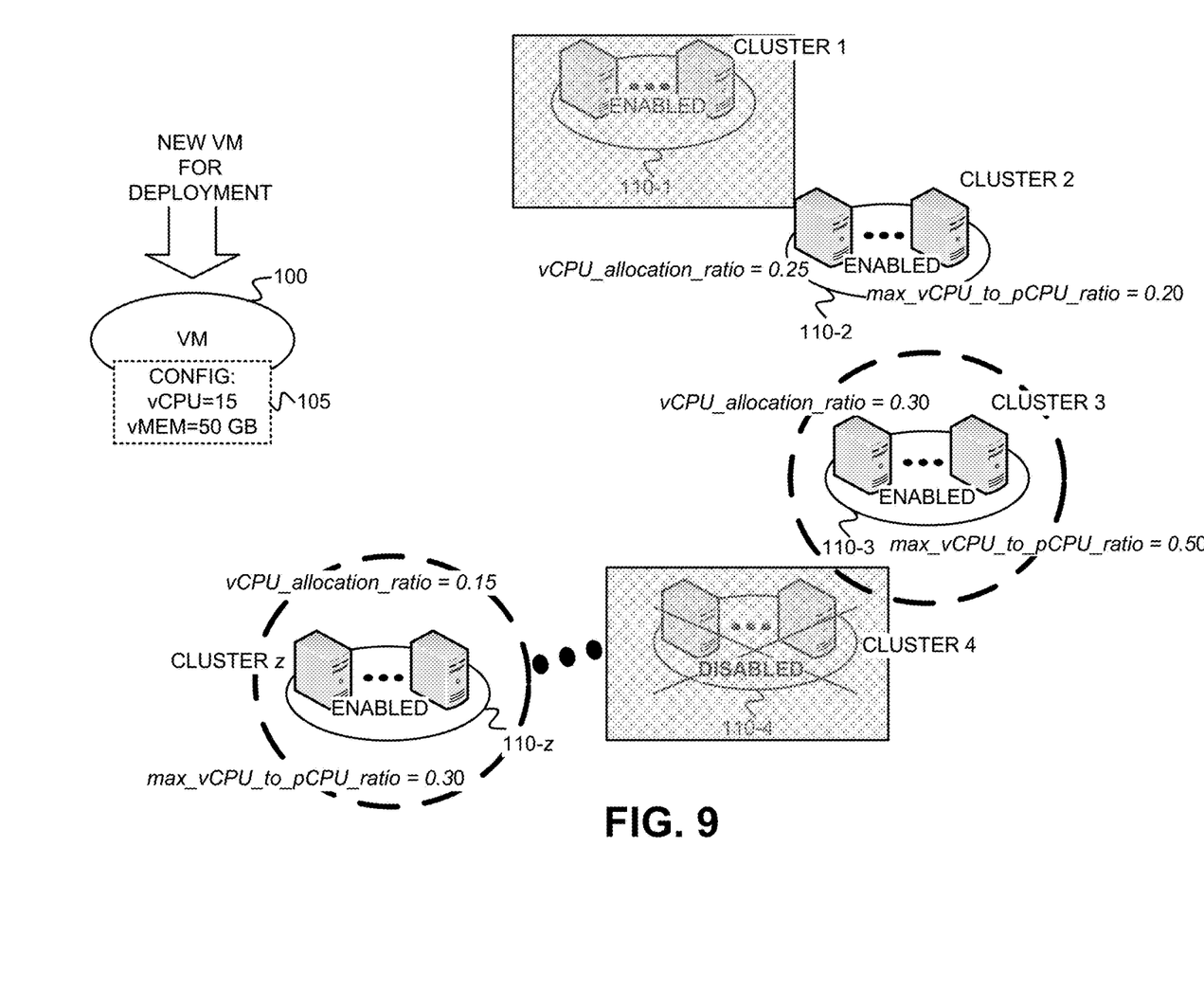

If one or more clusters have been identified in block 705 (YES—block 710), then VM deployment manager 220 may, for all of the identified server clusters, obtain a current value for vCPU_allocation_ratio and may return a cluster(s) of the identified cluster(s) having vCPU_allocation_ratio less than max_vCPU_to_pCPU ratio (block 720). The current value of vCPU_allocation_ratio for each identified server cluster may be calculated as described with respect to block 605 of FIG. 6, and compared to the value for max_vCPU_to_pCPU_ratio for a respective server cluster received in block 515 of FIG. 5. Returning to the example, among the identified server clusters of FIG. 8, cluster 110-2 has, as shown in FIG. 9, a vCPU_allocation_ratio of 0.25 and a value for max_vCPU_to_pCPU_ratio of 0.20, cluster 3 has a vCPU_allocation_ratio of 0.30 and a value for max_vCPU_to_pCPU_ratio of 0.50, and cluster 110-z has a value for vCPU_allocation_ratio of 0.15 and a value for max_vCPU_to_pCPU_ratio of 0.30. As shown by the dashed circular lines in FIG. 9, cluster 110-3, having a vCPU_allocation_ratio of 0.30 that is less than the max_vCPU_to_pCPU_ratio of 0.50, and cluster 110-z, having a vCPU_allocation_ratio of 0.15 that is less than the max_vCPU_to_pCPU_ratio of 0.30, are returned. VM deployment manager 220 may determine if any cluster(s) has/have been returned in block 720 (block 725). If no clusters are returned (NO—block 725), then VM deployment manager 220 may not deploy the new VM in a server cluster (block 730) and the exemplary server cluster selection process for the new VM may end.

Figure 10:
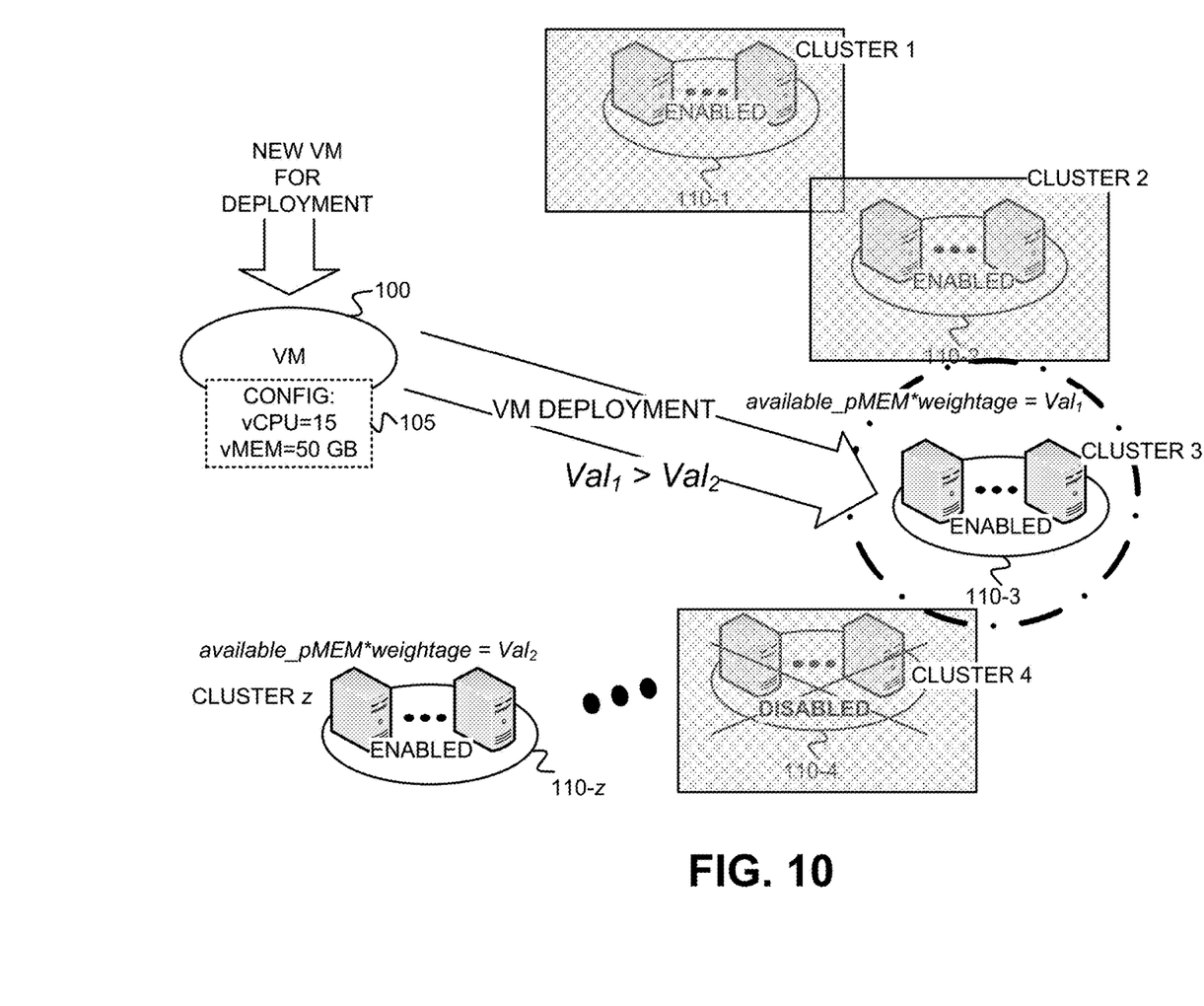

If one or more clusters have been returned in block 720 (YES—block 725), then VM deployment manager 220 may, for each returned server cluster, determine available_pMEM *weightage and select the server cluster of the returned cluster(s) having a maximum value (block 735). The value for available_pMEM may have been calculated in block 620 of FIG. 6 for each of the returned server clusters. The selection preference parameter weightage may have been received in block 520 of FIG. 5 for each of the returned server clusters. Returning to the example, among the returned server clusters of FIG. 9, cluster 110-3 has, as shown in FIG. 10, a value for available_pMEM*weightage equal to $Val_1$, and cluster 110-z has a value for available_pMEM*weightage equal to $Val_2$, where $Val_1$ is greater than $Val_2$. Therefore, $Val_1$ is the maximum value among the returned server clusters, and cluster 110-3 is selected.

VM deployment manager 220 may deploy and provision the new VM in the server cluster selected in block 735 (block 740). In the example of FIG. 10, since the value for available_pMEM*weightage of cluster 110-3 is greater than equal to the value for available_pMEM*weightage of cluster 110-z, cluster 110-3 is selected, as shown with the dashed circular line in FIG. 10, for VM deployment. VM deployment manager 220 (not shown in this figure) deploys and provisions new VM 100 in selected server cluster 110-3, in the example depicted in FIG. 10.

The blocks 700-740 of FIG. 7 may be repeated for each new VM identified at VM deployment manager 220 for deployment in a selected server cluster.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5-7, the order of the blocks may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, at a device, a virtual machine (VM) to be deployed;
identifying, by the device, a plurality of network device clusters for possible VM deployment;
applying, by the device, a weighting parameter to at least one of the plurality of network device clusters to favor selection of the at least one of the plurality of network device clusters over other of the network device clusters, wherein applying the weighting parameter comprises:
  selecting a specific weighting parameter for each of the network device clusters of the plurality of network device clusters;
  determining an amount of available physical memory for each of the network device clusters; and
  multiplying the specific weighting parameter with the amount of the available physical memory to generate a cluster selection value for each of the network device clusters;
receiving, at the device, user selection of one or more network device clusters from the plurality of network device clusters to generate a disabled group of network device clusters and an enabled group of network device clusters, wherein the disabled group of network device clusters excludes at least one of the plurality of network device clusters;
selecting, by the device, a network device cluster, from the enabled group of network device clusters, for deployment of the VM based on the weighting parameter applied to the at least one of the plurality of network device clusters, wherein selecting the network device cluster comprises:
  identifying one or more network device clusters, from the enabled group of network device clusters, assigned a value for a maximum virtual central processing unit (vCPU) allowed per VM that is greater than or equal to the vCPU of the VM to be deployed;
  determining an allocation parameter, that specifies an over-allocation of physical central processing units (CPUs) to virtual CPUs that is permitted within each network device cluster of the identified one or more network device clusters;
  determining each network device cluster of the identified one or more network device clusters, whose determined allocation parameter is less than a user-defined maximum vCPU to physical CPU (pCPU) ratio, to generate a list of returned network device clusters; and
  selecting the network device cluster of the enabled group of network device clusters from the list of returned network device clusters having a maximum cluster selection value; and
deploying the VM in the selected network device cluster.

2. The method of claim 1, wherein selecting the network device cluster further comprises:
applying a selection algorithm to select the network device cluster, wherein the selection algorithm uses the weighting parameter, the amount of available physical memory for each network device cluster of the enabled group of network device clusters, and a number of physical central processing units (CPUs) deployed in each network device cluster of the enabled group of network device clusters for selecting the network device cluster.

3. The method of claim 1, further comprising:
receiving, at the device, configuration information associated with the VM to be deployed, wherein the configuration information includes a vCPU parameter that indicates a number of virtual CPUs required by the VM and a virtual memory (vMEM) parameter that indicates an amount of virtual memory required by the VM,
wherein selecting the network device cluster, from the enabled group of network device clusters, for deployment of the VM is further based on the vCPU parameter and the vMEM parameter.

4. The method of claim 1, wherein the selecting the network device cluster, from the enabled group of network device clusters, for deployment of the VM further comprises:
determining, for each returned network device cluster from the list of returned network device clusters, a value for available physical memory (pMEM) multiplied by a user-defined weighting parameter for each returned network device cluster, and
selecting the network device cluster, from the list of returned network device clusters, having a maximum value for the pMEM multiplied by the weighted parameter.

5. The method of claim 1, wherein determining the allocation parameter is based on:
1) a sum of a number of virtual CPUs currently being used by the VMs running on each network device cluster,
2) a maximum number of physical host failures allowed in each network device cluster, and
3) a sum of a number of physical CPUs deployed in each network device cluster.

6. The method of claim 1, wherein the specific weighting parameter is selected by an administrator.

7. A device, comprising:
a communication interface configured to connect to a network;
a memory configured to store instructions; and
a processing unit configured to execute the instructions stored in the memory to:
  receive configuration information associated with a new virtual machine (VM) to be deployed, wherein the configuration information includes a virtual central processing unit (vCPU) parameter that indicates a number of virtual CPUs required by the new VM and a virtual memory (vMEM) parameter that indicates an amount of virtual memory required by the new VM,
  identify one or more network device clusters, of multiple network device clusters, assigned a value for a maximum vCPU allowed per VM that is greater than or equal to the vCPU of the new VM,
  determine an allocation parameter, that specifies an over-allocation of physical central processing units (CPUs) to virtual CPUs that is permitted within each network device cluster of the identified one or more network device clusters;
  determine each network device cluster of the identified one or more network device clusters, whose determined allocation parameter is less than a user-defined maximum vCPU to physical CPU (pCPU) ratio, to generate a list of returned network device clusters, determine, for each returned network device cluster from the list of returned network device clusters, a value for available physical memory (pMEM) multiplied by a user-defined weighting parameter for each returned network device cluster, select a network device cluster from the list of returned network device clusters having a maximum value for the pMEM multiplied by the weighting parameter, and cause, via the communication interface, the new VM to be deployed in the selected network device cluster.

8. The device of claim 7, wherein if no network device clusters of the multiple network device clusters are identified as having the maximum vCPU allowed per VM that is greater than or equal to the vCPU of the new VM, then the processing unit is further configured to not deploy the new VM.

9. The device of claim 7, wherein the multiple network device clusters comprise network device clusters in a group of network device clusters that have been enabled for VM deployment by an administrator.

10. The device of claim 7, wherein determining the allocation parameter is based on:
1) a sum of a number of virtual CPUs currently being used by the VMs running on each network device cluster,
2) a maximum number of physical host failures allowed in each network device cluster, and
3) a sum of a number of physical CPUs deployed in each network device cluster.

11. A non-transitory storage medium storing instructions executable by a device, wherein the instructions comprise instructions to:
receive a virtual machine (VM) to be deployed;
identify a plurality of network device clusters for possible VM deployment;
apply a weighting parameter to at least one of the plurality of network device clusters to favor selection of the at least one of the plurality of network device clusters over other of the network device clusters, wherein the instructions to apply the weighting parameter further comprise instructions to:
select a specific weighting parameter for each of the network device clusters of the plurality of network device clusters;
determine an amount of available physical memory for each of the network device clusters; and
multiply the specific weighting parameter with the amount of the available physical memory to generate a cluster selection value for each of the network device clusters;
receive user selection of one or more network device clusters from the plurality of network device clusters to generate a disabled group of network device clusters and an enabled group of network device clusters, wherein the disabled group of network device clusters excludes at least one of the plurality of network device clusters;
select a network device cluster, from the enabled group of network device clusters, for deployment of the VM based on the weighting parameter applied to the at least one of the plurality of network device clusters, wherein the instructions to select the network device cluster further comprise instructions to:
identify one or more network device clusters, from the enabled group of network device clusters, assigned a value for a maximum virtual central processing unit (vCPU) allowed per VM that is greater than or equal to the vCPU of the VM to be deployed;
determine an allocation parameter, that specifies an over-allocation of physical central processing units (CPUs) to virtual CPUs that is permitted within each network device cluster of the identified one or more network device clusters;
determine each network device cluster of the identified one or more network device clusters, whose determined allocation parameter is less than a user-defined maximum vCPU to physical CPU (pCPU) ratio, to generate a list of returned network device clusters; and
select the network device cluster of the enabled group of network device clusters from the list of returned network device clusters having a maximum cluster selection value; and
deploy the VM in the selected network device cluster.

12. The non-transitory storage medium of claim 11, wherein the instructions to select the network device cluster further comprise instructions to:
apply a selection algorithm to select the network device cluster, wherein the selection algorithm uses the weighting parameter, the amount of available physical memory for each network device cluster of the enabled group of network device clusters, and a number of physical central processing units (CPUs) deployed in each network device cluster of the enabled group of network device clusters for selecting the network device cluster.

13. The non-transitory storage medium of claim 11, wherein the instructions further comprise instructions to:
receive configuration information associated with the VM to be deployed, wherein the configuration information includes a vCPU parameter that indicates a number of virtual CPUs required by the VM and a virtual memory (vMEM) parameter that indicates an amount of virtual memory required by the VM,
wherein selecting the network device cluster, from the enabled group of network device clusters, for deployment of the VM is further based on the vCPU parameter and the vMEM parameter.

14. The non-transitory storage medium of claim 11, wherein the instructions to select a network device cluster, from the enabled group of network device clusters, for deployment of the VM further comprise instructions to:
determine, for each returned network device cluster from the list of returned network device clusters, a value for available physical memory (pMEM) multiplied by a user-defined weighting parameter for each returned network device cluster, and
select the network device cluster, from the list of returned network device clusters, having a maximum value for the pMEM multiplied by the weighted parameter.

15. The non-transitory storage medium of claim 11, wherein determining the allocation parameter is based on:
1) a sum of a number of virtual CPUs currently being used by the VMs running on each network device cluster,
2) a maximum number of physical host failures allowed in each network device cluster, and
3) a sum of a number of physical CPUs deployed in each network device cluster.

16. The non-transitory storage medium of claim 11, wherein the specific weighting parameter is selected by an administrator.

* * * * *